US005460865A

United States Patent [19]
Tsotsis

[11] Patent Number: 5,460,865
[45] Date of Patent: Oct. 24, 1995

[54] HYBRID HONEYCOMB SANDWICH PANEL

[75] Inventor: Thomas K. Tsotsis, Orange, Calif.

[73] Assignee: Ciba-Geigy Corporation, Ardsley, N.Y.

[21] Appl. No.: 210,393

[22] Filed: Mar. 18, 1994

Related U.S. Application Data

[63] Continuation-in-part of Ser. No. 61,650, May 13, 1993, abandoned.

[51] Int. Cl.⁶ ..................................................... B32B 3/12
[52] U.S. Cl. ......................... 428/116; 52/793.1; 428/118
[58] Field of Search ............................. 428/116, 73, 117, 428/118; 52/806; 156/292

[56] References Cited

U.S. PATENT DOCUMENTS

| | | | |
|---|---|---|---|
| 3,616,139 | 10/1971 | Jones | 428/117 X |
| 3,620,870 | 11/1971 | Maistre | 428/119 X |
| 3,653,851 | 4/1972 | Gruber | 428/539.5 |
| 3,771,748 | 11/1973 | Jones | 428/116 X |
| 4,052,523 | 10/1977 | Rhodes et al. | 428/116 |
| 4,053,667 | 10/1977 | Smith | 428/116 X |
| 4,231,827 | 11/1980 | Wilson et al. | 428/412 X |
| 4,336,292 | 6/1982 | Blair | 428/116 |
| 4,465,725 | 8/1984 | Riel | 428/116 |
| 4,933,131 | 6/1990 | Okey et al. | 428/116 X |
| 4,937,125 | 6/1990 | Sanmartin et al. | 428/116 |
| 5,041,323 | 8/1991 | Rose et al. | 428/116 |
| 5,106,668 | 4/1992 | Turner et al. | 428/116 |
| 5,186,999 | 2/1993 | Brambach | 428/117 |

Primary Examiner—Henry F. Epstein
Attorney, Agent, or Firm—Luther A. R. Hall

[57] ABSTRACT

A combination of a thin upper honeycomb core plus a lower honeycomb core of equal or lower density than the upper core united by only a thin light weight interlayer within two outer skins provides a low weight hybrid panel with increased durability when the upper surface is subjected to localized compressive loads.

36 Claims, 2 Drawing Sheets

HYBRID HONEYCOMB SANDWICH PANEL

This is a continuation-in-part of application Ser. No. 08/061,650, filed on May 13, 1993 and now abandoned.

This invention pertains to a low weight panel with increased durability when the upper surface is subjected to localized compressive loads.

BACKGROUND OF THE INVENTION

Current sandwich structures used for aircraft flooring use only a single density honeycomb core in this construction. Heavy traffic on such flooring frequently causes failure or damage to the upper surface requiring that the flooring be replaced at great cost and inconvenience.

In order to increase the durability of such flooring panels and to increase their resistance to concentrated transverse compressive loads, either more skin material or higher honeycomb core densities or both must be used. Both of these remedies are basically unacceptable since they each substantially increase the panel weight. This is an unacceptable solution for aircraft structures where a minimum weight is always desired.

Many attempts to solve the problems stated above have been made. U.S. Pat. No. 4,937,125 describes one approach where a multilayer sandwich structure having a core interposed between and external and internal skin. The upper skin is a composite layer-polyester layer-honeycomb layer-metal sheet-glass fiber reinforced epoxy layer-composite layer. The core is a honeycomb. The internal skin is a metal sheet or a skin of the same composition as the external skin.

U.S. Pat. Nos. 4,336,292; 5,041,323 and 5,106,668 describe multi-layered panels comprised substantially of two or several subpanels—one possibly with a higher density core than the other(s)—bonded together to form a complete panel. The latter example would work successfully, but, because of the method and materials of construction, additional materials over and above those of the instant invention are required resulting in a panel which is too costly and substantially overweight for aerospace applications.

In the present invention, two cores of either the same or different densities and/or cell sizes are combined by means of a light weight septum to form a hybrid core. The septum material is not of the same material as the outer skins of the sandwich panel and serves as a means to transfer load between the upper and lower portions of the structure. There is no requirement that the two honeycomb cores be aligned. That the septum prevents relative movement between the two cores is necessary, but not sufficient. The septum must be both sufficiently stiff and strong to redistribute localized compressive loads as well as being sufficiently light in weight to provide panels which can meet desired weight limits.

Accordingly, improving the upper surface properties of sandwich structures which are subject to in-use concentrated loads to make them more durable is highly desired. This will reduce life-cycle costs for airlines by decreasing the necessity for replacing damaged panels. The instant invention provides that improved panel by tailoring the core to have enhanced properties just where needed (fight below the upper skin) to achieve greater resistance to concentrated transverse compressive loads with a much smaller or even no weight penalty.

Honeycomb sandwich structures are widely used for aircraft flooring materials. In these structures, the in-plane and bending properties needed are those derived from design requirements of the airframe manufacturers. The out-of-plane properties are, by contrast, determined from test data on existing materials which are believed to meet the perceived requirements. It is known that the damage that causes panels to be replaced after use in aircraft occurs almost exclusively at the top surface of the panels and is due to concentrated out-of-plane loads. This damage is believed to be due to passenger foot traffic (most likely from high heels) administering localized concentrated loads on the panels.

The instant invention addresses the issue of floor panel durability by providing constructions which increase the resistance of aircraft flooring to concentrated out-of-plane loads without either increasing weight or significantly influencing cost when compared to standard uniform density honeycomb core construction. By using higher density materials near the top (loaded) surface of a sandwich structure, the resistance to damage such as core fracture, resin fracture, core buckling, etc. due to localized compressive loads is increased.

SUMMARY OF THE INVENTION

The invention pertains to a hybrid honeycomb sandwich structure with an equal or higher density layer near the top surface and a equal or lower density second layer beneath. The two layers are joined with an interlayer different from the outer skins and is used to distribute load from the first into the second layer so as to minimize localized stresses.

More particularly, the instant invention is to a hybrid honeycomb sandwich panel, having upper surface enhancement for improved resistance to damage from localized compressive loads, which comprises a first honeycomb core sheet having a multiplicity of cells, said cells directed transverse to said panel;

a second honeycomb core sheet of equal or lower density than the first sheet beneath the first sheet and having a multiplicity of cells, said cells directed transverse to said panel;

a thin adhesive interlayer bonding the lower surface of the first higher density honeycomb core sheet to the upper surface of the second lower density honeycomb core sheet;

a top skin adhered to the upper surface of the first higher density honeycomb core sheet; and a lower skin adhered to the lower surface of the second lower density honeycomb core sheet.

BRIEF DESCRIPTION OF THE DRAWINGS

Details of the invention and of the preferred embodiments thereof will be further understood upon reference to the drawings wherein.

DETAILED DISCLOSURE

Figure 1:
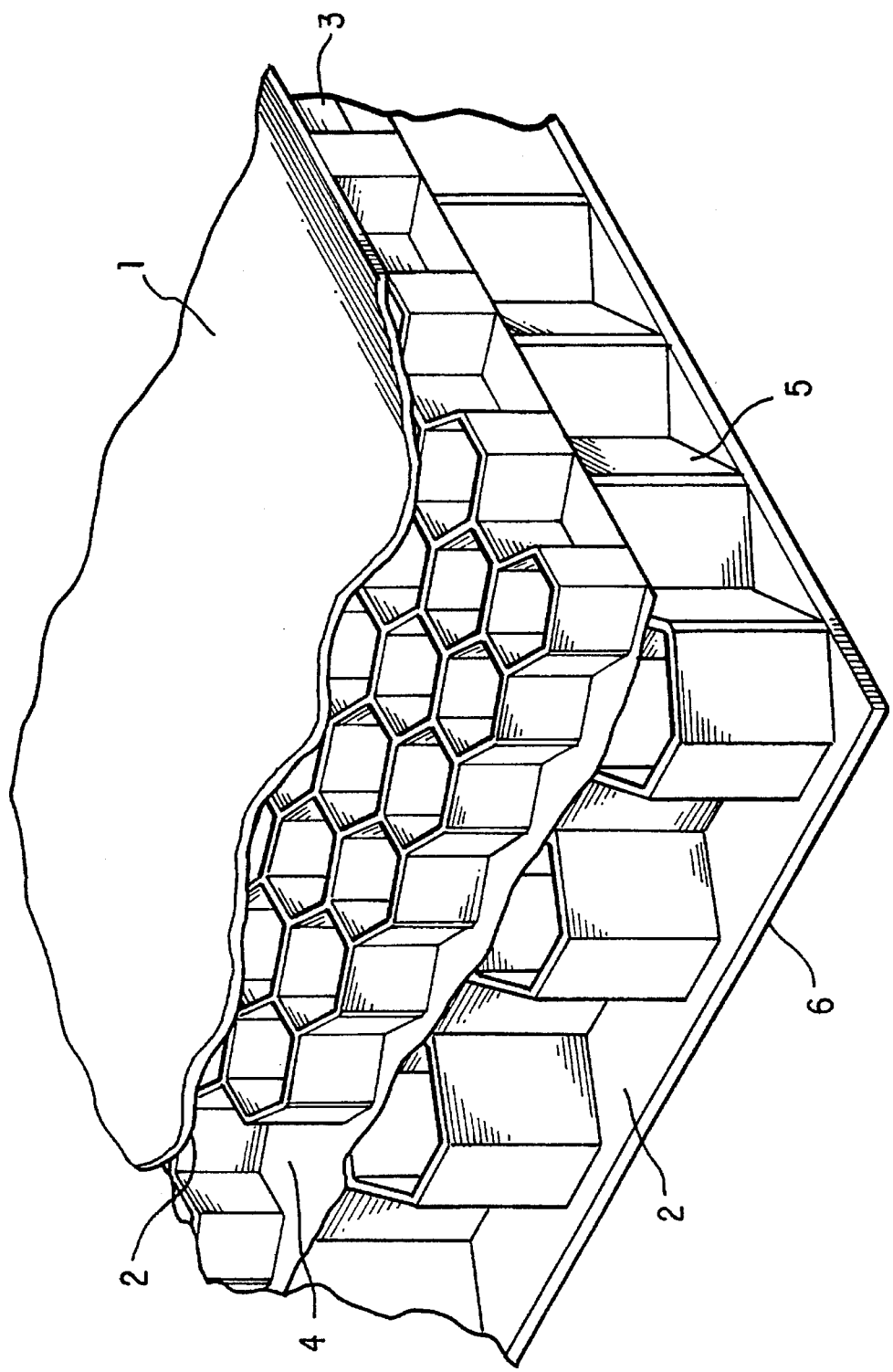
FIG. 1 is a perspective view, partially cut away, of the instant hybrid sandwich panel.
Figure 2:
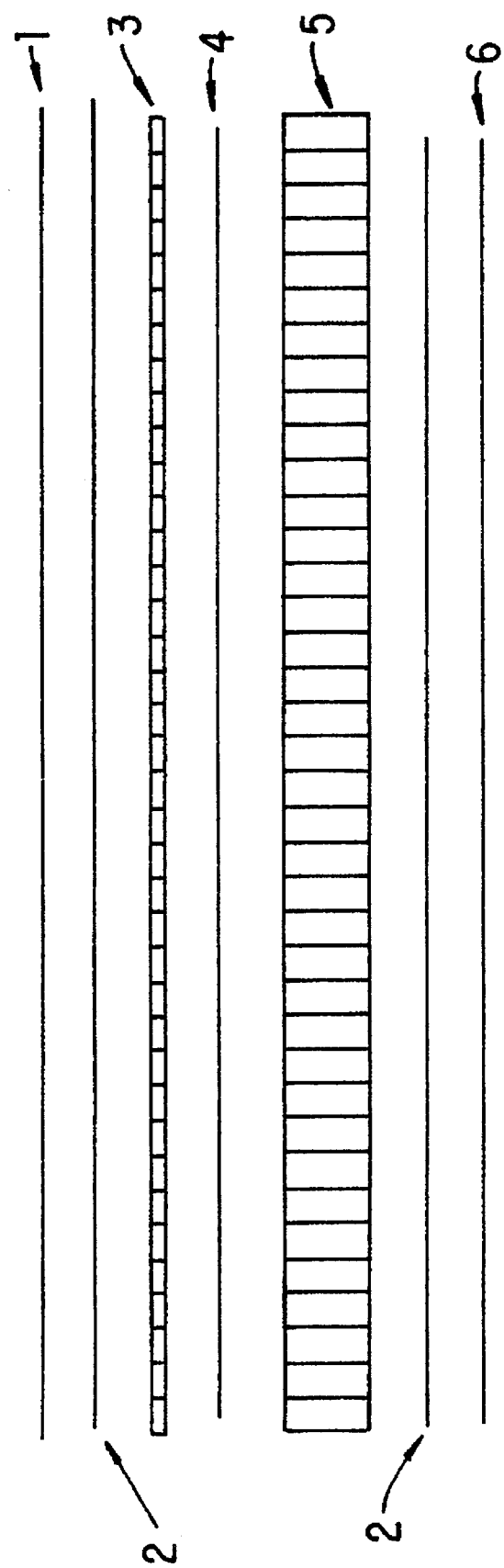
FIG. 2 is a vertical schematic view through the panel of FIG. 1.

The present invention pertains to a honeycomb sandwich structure as seen in FIG. 1 with a rust layer 3 near the top Goaded) surface 1 and a second layer 5 beneath the first. Preferably, the rust layer 3 is of equal or greater density than the second layer 5. Preferably, the layer 3 and layer 5 of the honeycomb structure are made of either aluminum or a paper composed of thermoplastic fiber such as NOMEX®

(aramid fiber, E. I. duPont de Nemours & Co., Wilmington, Del.). The rust and second layers are bonded together by an interlayer 4 composed of either a scrim cloth adhesive or an adhesively bonded layer of a thermoplastic paper such as NOMEX® described above. The cell size, cell wall thickness and mass density of the first honeycomb layer 3 are chosen to meet the desired mechanical requirements for indentation resistance. The mass density is typically between 1 lb/ft$^3$ (16 kg/m$^3$) to 55 lb/ft$^3$ (880 kg/m$^3$), preferably 6 lb/ft$^3$ (96 kg/m$^3$) and 11.5 lb/ft$^3$ (185 kg/m$^3$). The mass density of the second honeycomb layer 5 is selected primarily to be of sufficiently low density that the total panel weight meets a specified target and is typically between 1 lb/ft$^3$ (16 kg/m$^3$) and 55 lb/ft$^3$ (880 kg/m$^3$), but preferably between 3 lb/ft$^3$ (48 kg/m$^3$) and 7 lb/ft$^3$ (112 kg/m$^3$). The interlayer 4 is selected for its ability to distribute load from the first layer into the second layer in order to minimize stress concentrations.

The instant hybrid sandwich panels also contain an upper skin 1 and a lower skin 6 which are attached to the upper core 3 and the lower core 5 by way of adhesive layers 2 as seen in FIG. 1.

The first honeycomb core sheet 3 and the second honeycomb core sheet 5 may be composed of the same or different materials. The first honeycomb core sheet is preferably 0.05" to 0.10" (1.2 mm to 2.5 mm) in thickness. Preferably the honeycomb core sheets are composed of aramid fiber paper.

The honeycomb core 3 or 5 is made of an inorganic paper, a formable plastic, a thermoplastic fiber paper or a metal. Preferably, the honeycomb core 3 or 5 is made of a thermoplastic paper, most preferably aramid fiber paper, or aluminum.

When the adhesive 2 is a thermoset resin or when the top skin 1 or the bottom skin 6 is a fiber reinforced resin which is a thermoset resin, said resin is an epoxy, phenolic, polyester or polyimide resin.

When the adhesive 2 is a thermoplastic resin or when the top skin 1 or the bottom skin 6 is a fiber reinforced resin which is a thermoplastic resin, said resin is a polycarbonate, polyetherimide, polyetherketone, polysulfone, polyester, poly(arylene sulfide), polyamide or polyphenylene oxide resin.

The interlayer 4 is a supported adhesive, a film adhesive or an adhesively bonded thermoplastic paper.

It is also contemplated that the upper honeycomb core 3 can be replaced by a three-dimensional thermoplastic sheet such as QUADRACORE™ (Ciba Composites, Anaheim). This material is produced by imparting an "egg carton" shape to a thermoplastic sheet under heat and pressure. When the upper honeycomb core 3 is replaced by the three-dimensional thermoplastic sheet, processing must be modified to maintain dimensional tolerance in the thickness direction in the final panel. This can be accomplished by the use of simple mechanical stops in the press where the panel is heat processed to cure the skins and the adhesive.

The following examples are presented for the purpose of illustration only and are not to be construed to limit the nature or scope of the instant invention in any manner whatsoever.

| Materials Used | | |
| --- | --- | --- |
| Signs: | UD S2-Glass/DLS-280 | 10TPI (fiber tows per inch) |
| | Unidirectional S2-glass/DLS epoxy prepreg (Composite Materials, Anaheim) | |
| Core: | Aeroweb HMX ⅛ | −5.0 lb/ft$^3$ |
| | NOMEX ® Honeycomb ⅛" cell size (Composite Materials, Anaheim) | −11.5 lb/ft$^3$ |
| Adhesives: | Sign-to-Core (Adhesive is epoxy based.) | R377 |
| Carriers for Core-to-Core Bonding using R377 Adhesive | | 6AC Tricot nylon Chopped Graphite Material (Grade 500) |

EXAMPLE 1

A panel is assembled as for single core panels with only the additional steps of placing the interlayer 4 on the lower density core 5 followed by the higher density core 3 on top of the interlayer 4. FIG. 1 shows a perspective view of an assembled panel cross-section. The top skin 1 is preferably a fiber glass reinforced epoxy. Other materials such as graphite/epoxy, graphite/phenolic, fiber glass/phenolic and the like may also be used. The bottom skin 6 is generally composed of the same material as the top skin 1 although its thickness may be different. The adhesive layers 2 serve to adhere skins 1 and 6 to the cores 3 and 5 respectively. The adhesive layers 2 are preferably an epoxy, but other polymeric adhesives may be utilized as well. The interlayer 4 is a combination of a scrim cloth and adhesive or a paper and adhesive and is constructed from materials substantially lower in weight density than those used for skins 1 and 6.

EXAMPLE 2

Test Method

A simply-supported 12"×12" (305 mm×305 mm) panel, prepared as seen in Example 1, is loaded using a flat-faced circular cylindrical steel indenter of either ¼" (6.35 mm) or ½" (12.7 mm) diameter placed atop a ⅛" (3.18 mm) Shore hardness 55–65 silicone rubber which is placed between the indenter and the top surface of the panel to be tested.

Load versus displacement is continuously monitored during the loading process. When a discrete load drop occurs, the test is ended and the maximum load reached prior to load drop is recorded as indentation strength.

In order to account for variations between core batches, in all cases, indentation strength data from the reinforced or enhanced surface are compared with either a section of the same panel which is unreinforced or with the bottom of the same panel which is also unreinforced. Therefore, all indentation strength comparisons are measured between identical cores.

Using a hybrid core structure where a high density upper honeycomb core is adhered to a low density honeycomb core using the indicated adhesive, the indentation strength (lb) is measured on each side of the structure.

| Example | Core/Adhesive |
| --- | --- |
| A | HMX-⅛-11.5 over EM-⅛-5.0/Tricot carrier adhesive |
| B | HMX-⅛-11.5 over HMX-1.8-5.0/6AC carrier adhesive |
| C | HMX-⅛-11.5 over HMX-1.8-5.0/Graphite Mat |

-continued

| Example | Core/Adhesive |
|---|---|
| | (Grade 500) adhesive |

The Tricot is a nylon weave while the 6AC is chopped nylon fiber. The results below indicate that scrim cloths of a continuous nature perform better than those of chopped fibers.

| | Indentation Strength (lb) | | |
|---|---|---|---|
| Example | Upper 11.5 Side Enhanced Surface | Lower 5.0 Side Unreinforced Surface | Percent Difference |
| | ¼ inch (6.35 mm) Indenter | | |
| A | 132 | 74 | +79 |
| B | 79 | 66 | +20 |
| C | 73 | 67 | +9 |
| | ½ inch (12.7 mm) Indenter | | |
| A | 180 | 170 | +6 |
| B | 152 | 169 | −11 |
| C | 114 | 156 | −40 |

Examples A, B and C show the strong influence of the interlayer 4 on indentation resistance. In Example A, the interlayer provides a greatly enhanced resistance to concentrated loads such as that input by the ¼" (6.35 mm) indenter and shows no loss of indentation resistance for larger less concentrated loads such as that input by the ½" (12.7 mm) indenter. By contrast in Example C, little enhancement is provided in the ¼" results and a large decrease in indentation resistance is measured for the ½" indenter.

These results show the increased resistance to concentrated loadings which is independent of stabilized core compression strength. In the latter standard panel test where both sides of a 1×1" (2.54 cm×2.54 cm) sandwich panel section is subjected to pressure on both faces of the panel, failure occurs essentially midway in the core itself.

By contrast, the localized compression loading test is described in Example 2 of this application and approximates what happens when a localized concentrated load (such as a person wearing a high heel walks on the panel) impacts the top surface of the panel. Failure in this test occurs just beneath the upper surface of the panel.

As the load area increases (as going from a ¼ inch indenter to a ½ inch indenter, the failure mode alters somewhat as shear and compressive contributions to failure change. However, because the indentation section is not supported from beneath (only at the edge of the panel), its failure mode is always different from stabilized core compression where there is total support beneath the panel.

EXAMPLE 3

Following the procedure of Example 2, additional hybrid core structures where a high density upper NOMEX® (HMX) honeycomb core is adhered to a low density honeycomb NOMEX® (HMX) core using a nylon tricot (Gehring Textiles, WW516) with R377 epoxy based adhesive are tested for indentation strength.

| | HMX Upper Core | | HMX Lower Core | |
|---|---|---|---|---|
| Example | Thickness (in) | Density (pcf) | Thickness (in) | Density (pcf) |
| A | 0.070 | 11.5 | 0.305 | 3.0 |
| B | 0.070 | 11.5 | 0.305 | 5.0 |
| C | 0.056 | 9.0 | 0.318 | 3.0 |
| D | 0.056 | 11.5 | 0.318 | 3.0 |
| E | 0.070 | 9.0 | 0.305 | 3.0 |
| F | 0.070 | 9.0 | 0.305 | 5.0 |
| G | 0.056 | 9.0 | 0.318 | 5.0 |
| H | 0.056 | 11.5 | 0.318 | 5.0 |

| | Indentation Strength (lb) ¼ inch (6.35 mm) Indenter | | |
|---|---|---|---|
| Example | Upper Side Enhanced Surface | Lower Side Unreinforced Surface | Percent Difference |
| A | 64 | 39 | +64 |
| B | 96 | 80 | +20 |
| C | 57 | 40 | +43 |
| D | 56 | 38 | +47 |
| E | 59 | 37 | +60 |
| F | 104 | 71 | +47 |
| G | 82 | 90 | −9 |
| H | 81 | 77 | +5 |

| | ½ inch (12.7 mm) Indenter | | |
|---|---|---|---|
| Example | Upper Side Enhanced Surface | Lower Side Unreinforced Surface | Percent Difference |
| A | 103 | 82 | +26 |
| B | 157 | 170 | −8 |
| C | 90 | 77 | +17 |
| D | 87 | 77 | +13 |
| E | 100 | 79 | +37 |
| F | 190 | 171 | +11 |
| G | 185 | 179 | +3 |
| H | 149 | 175 | −15 |

The values for the lower side essentially represent what would be expected from a "normal" panel without the hybrid honeycomb core structure.

Inspection of the data in the table indicates that in nearly each instant structure the indentation strength of the hybrid honeycomb core panel is superior and in some cases significantly superior to the indentation strength values achievable with a "normal" panel.

EXAMPLE 4

Following the procedure of Example 2, additional hybrid core structures where a high density upper aluminum honeycomb core is adhered to a low density honeycomb aluminum core using a nylon tricot (Gehring Textiles, WW516) with R377 epoxy based adhesive are tested for indentation strength.

| | Aluminum Upper Core | | Aluminum Lower Core | |
|---|---|---|---|---|
| Example | Thickness (in) | Density (pcf) | Thickness (in) | Density (pcf) |
| A | 0.050 | 6.9 | 0.325 | 3.1 |
| B | 0.050 | 8.5 | 0.325 | 3.1 |
| C | 0.050 | 8.5 | 0.325 | 4.5 |
| D | 0.050 | 6.9 | 0.325 | 4.5 |
| E | 0.100 | 8.5 | 0.275 | 4.5 |
| F | 0.100 | 8.5 | 0.275 | 3.1 |

-continued

|   |       |     |       |     |
|---|-------|-----|-------|-----|
| G | 0.100 | 6.9 | 0.275 | 3.1 |
| H | 0.100 | 6.9 | 0.275 | 4.5 |

| | Indentation Strength (lb) ¼ inch (6.35 mm) Indenter | | |
|---|---|---|---|
| Example | Upper Side Enhanced Surface | Lower Side Unreinforced Surface | Percent Difference |
| A | 62 | 49 | +27 |
| B | 69 | 49 | +41 |
| C | 88 | 58 | +52 |
| D | 69 | 57 | +21 |
| E | 97 | 58 | +67 |
| F | 90 | 41 | +122 |
| G | 78 | 40 | +95 |
| H | 92 | 62 | +49 |

| | ½ inch (12.7 mm) Indenter | | |
|---|---|---|---|
| Example | Upper Side Enhanced Surface | Lower Side Unreinforced Surface | Percent Difference |
| A | 95 | 83 | +14 |
| B | 115 | 88 | +30 |
| C | 141 | 130 | +8 |
| D | 120 | 128 | −6 |
| E | 166 | 125 | +33 |
| F | 149 | 88 | +69 |
| G | 123 | 89 | +38 |
| H | 135 | 125 | +8 |

The values for the lower side essentially represent what would be expected from a "normal" panel without the hybrid honeycomb core structure.

Inspection of the data in the table indicates that in nearly each instant structure the indentation strength of the hybrid honeycomb core panel is significantly superior to the indentation strength values achievable with a "normal" panel.

EXAMPLE 5

Effect of Interlayer on Indentation Strength

Following the procedure of Example 2, additional hybrid core structures where a high density upper NOMEX® (HMX) honeycomb core is adhered to a low density honeycomb NOMEX® (HMX) core using a variety of interlayers are tested for indentation strength.

The upper core is HMX having a thickness of 0.070 inches and a density of 9.0 pcf and the lower core MHX having a thickness of 0.305 inches and a density of 5.0 pcf.

The adhesive is R377 epoxy based adhesive.

| Example | Interlayer |
|---|---|
| A | 120 E-glass (MIL-HDBK 23, widely available) |
| B | WW440 Polyester (Gehring Textiles, Inc.) |
| C | WW945 Nylon (Gehring Textlies, Inc.) |

| | Indentation Strength (lb) ¼ inch (6.35 mm) Indenter | | |
|---|---|---|---|
| Example | Upper Side Enhanced Surface | Lower Side Unreinforced Surface | Percent Difference |
| A | 92 | 73 | +26 |
| B | 98 | 72 | +36 |
| C | 110 | 72 | +53 |

-continued

| | ½ inch (12.7 mm) Indenter | | |
|---|---|---|---|
| Example | Upper Side Enhanced Surface | Lower Side Unreinforced Surface | Percent Difference |
| A | 194 | 170 | +14 |
| B | 203 | 158 | +31 |
| C | 209 | 163 | +28 |

The values for the lower side essentially represent what would be expected from a "normal" panel without the hybrid honeycomb core structure.

Inspection of the data in the table indicates that in nearly each instant structure the indentation strength of the hybrid honeycomb core panel is significantly superior to the indentation strength values achievable with a "normal" panel.

Each of the different interlayers can be used to provide improved indentation strength to the instant hybrid honeycomb panel structures.

EXAMPLE 6

Use of QUADRACORE™ in Hybrid Panels

When in the panels described in Example 1 the upper higher density core 3 is replaced with a thermoplastic three-dimensional sheet structure QUADRACORE™ excellent indentation strength is still obtained especially with the ¼" (6.35 mm) indenter in the test method described in Example 2.

The panels tested have a total thickness of 0.400" (9.800 mm) with the bottom honeycomb core of NOMEX® (HMX) having a thickness of 0.305" (7.4725 mm) and a cell size of 5/32" (4 mm) and a density of 3.0 pcf or 5.0 pcf, and the upper QUADRACORE™ having a thickness of 0.095" (2.3275 mm).

| | Indentation Strength (lb) | |
|---|---|---|
| Bottom Core | With QUADRACORE™ | Without QUADRACORE® |
| | ¼" (6.35 mm) Indenter | |
| HMX 5/32-3.0 | 54–66 | 39 |
| HMX 5/32-5.0 | 144–145 | 82 |
| | ½" (12.7 mm) Indenter | |
| HMX 5/32-3.0 | 86–93 | 88 |
| HMX 5/32-5.0 | 150–156 | 174 |

What is claimed is:

1. A hybrid honeycomb sandwich panel, having upper surface enhancement for improved resistance to damage from localized compressive loads, which comprises a fast honeycomb core sheet having a multiplicity of cells, said cells directed transverse to said panel;

a second honeycomb core sheet of equal or lower density than the first sheet and beneath the first sheet and having a multiplicity of cells, said cells directed transverse to said panel;

a thin adhesive interlayer bonding the lower surface of the first honeycomb core sheet to the upper surface of the second honeycomb core sheet;

a top skin adhered to the upper surface of the first honeycomb core sheet; and a lower skin adhered to the lower surface of the second honeycomb core sheet.

2. A panel according to claim 1 wherein the first honeycomb core sheet and the second honeycomb core sheet are composed of different materials.

3. A panel according to claim 1 wherein the first honeycomb core sheet is 0.05" to 0.10" in thickness.

4. A panel according to claim 1 wherein the first honeycomb core sheet is between 1 and 25% of the total panel thickness.

5. A panel according to claim 4 wherein the first honeycomb core sheet is between 5 and 10% of the total panel thickness.

6. A panel according to claim 1 wherein the first honeycomb core sheet and the second honeycomb core sheet are composed of the same material, but with different densities.

7. A panel according to claim 1 wherein the honeycomb core sheet is selected from the group consisting of an inorganic paper, formable plastic, thermoplastic fiber paper and metal.

8. A panel according to claim 7 wherein the honeycomb core sheets are composed of a thermoplastic fiber paper or aluminum.

9. A panel according to claim 8 wherein the honeycomb core sheets are composed of aramid fiber paper.

10. A panel according to claim 7 wherein the metal is aluminum.

11. A panel according to claim 1 wherein the first honeycomb core sheet has a mass density of between 1 lb/ft$^3$ and 55 lb/ft$^3$.

12. A panel according to claim 11 wherein the first honeycomb core sheet has a mass density between 6 lb/ft$^3$ and 11.5 lb/ft$^3$.

13. A panel according to claim 1 wherein the second honeycomb core sheet has a mass density of between 1 lb/ft$^3$ and 55 lb/ft$^3$.

14. A panel according to claim 13 wherein the second honeycomb core sheet has a mass density between 3 lb/ft$^3$ and 7 lb/ft$^3$.

15. A panel according to claim 1 wherein the interlayer is a supported adhesive, a film adhesive or an adhesively bonded thermoplastic paper.

16. A panel according to claim 15 wherein the adhesive is a thermoset resin.

17. A panel according to claim 16 wherein the adhesive is an epoxy resin, a phenolic resin or a polyimide resin.

18. A panel according to claim 1 wherein the top skin and the bottom skin are composed of the same material.

19. A panel according to claim 18 wherein the top skin and the bottom skin are composed of the same material and are a fiber reinforced resin.

20. A panel according to claim 19 wherein the fiber reinforced resin is a glass- or graphite-reinforced thermoset resin.

21. A panel according to claim 20 wherein the thermoset resin is an epoxy, phenolic, polyester or polyimide resin.

22. A panel according to claim 19 wherein the fiber reinforced resin is a glass- or graphite-reinforced thermoplastic resin.

23. A panel according to claim 22 wherein the thermoplastic resin is a polycarbonate, polyetherimide, polyetherketone, polysulfone, polyester, poly(arylene sulfide), polyamide or polyphenylene oxide resin.

24. A panel according to claim 19 wherein the fiber reinforced resin is fiber glass reinforced epoxy resin.

25. A panel according to claim 18 wherein the top skin and the bottom skin are composed of the same material and are a metal.

26. A panel according to claim 25 wherein the metal is aluminum.

27. A panel according to claim 1 wherein the top skin and the bottom skin are composed of different materials.

28. A panel according to claim 27 wherein one of the skins is a metal.

29. A panel according to claim 28 wherein the metal is aluminum.

30. A panel according to claim 27 wherein one of the skins is a fiber reinforced resin.

31. A panel according to claim 30 wherein the fiber reinforced resin is a glass- or graphite-reinforced thermoset resin.

32. A panel according to claim 31 wherein the thermoset resin is an epoxy, phenolic, polyester or polyimide resin.

33. A panel according to claim 30 wherein the fiber reinforced resin is a glass- or graphite-reinforced thermoplastic resin.

34. A panel according to claim 33 wherein the thermoplastic resin is a polycarbonate, polyetherimide, polyetherketone, polysulfone, polyester, poly(arylene sulfide), polyamide or polyphenylene oxide resin.

35. A panel according to claim 1 wherein the first honeycomb core is a formable plastic sheet.

36. A panel according to claim 35 wherein the formable plastic sheet is a three-dimensional waffled polycarbonate sheet.

* * * * *